United States Patent [19]
Ochoa et al.

[11] Patent Number: 6,046,268
[45] Date of Patent: Apr. 4, 2000

[54] ELECTRODE WITH ENHANCED ADHESION TO SUBSTRATES

[75] Inventors: Rosibel Ochoa; Edmond Louie; Felicia Manole; Frank Russell Denton, III, all of Lawrenceville, Ga.

[73] Assignee: Motorola, Inc., Schaumburg, Ill.

[21] Appl. No.: 09/127,800

[22] Filed: Aug. 2, 1998

[51] Int. Cl.⁷ .............................. C08K 3/04; H01M 4/02
[52] U.S. Cl. ................. 524/495; 429/231.4; 429/231.8; 429/231.5; 429/231.95; 429/304; 429/303
[58] Field of Search .............................. 429/231.4, 231.8, 429/231.95, 231.5, 304, 303; 524/495

[56] References Cited

U.S. PATENT DOCUMENTS

| | | | |
|---|---|---|---|
| 5,100,523 | 3/1992 | Helms et al. | 429/213 |
| 5,158,843 | 10/1992 | Batson et al. | 429/231.8 |
| 5,436,091 | 7/1995 | Shackle et al. | 429/231.5 |
| 5,672,446 | 9/1997 | Barker et al. | 429/231.8 |
| 5,753,387 | 5/1998 | Takami et al. | 429/231.4 |

OTHER PUBLICATIONS

Wake, Adhesion and the Formulation of Adhesives, 2ndEdition, Applied Science Publishers, p. 25, p. 32–33, and p. 38, 1982.

*Primary Examiner*—David W. Wu
*Assistant Examiner*—Ling Siu Choi
*Attorney, Agent, or Firm*—Felipe J. Farley; Philip H. Burrus, IV

[57] ABSTRACT

An electrode coating with improved adhesion to substrates comprises small particles of an active material that are preferentially distributed at the interface with the supporting substrate.

10 Claims, 3 Drawing Sheets

ELECTRODE WITH ENHANCED ADHESION TO SUBSTRATES

TECHNICAL FIELD

This invention relates in general to the field of electrochemical cells, and in particular to methods of improving cyclability of electrodes for lithium ion cells.

BACKGROUND OF THE INVENTION

As electronic devices increasingly become portable, advances must be made in energy storage systems to enable such portability. Indeed, it is often the case with current electronic technology that the limiting factor to portability of a given device is the size and the weight of the associated energy storage device. A small energy storage device, such as a battery, may be fabricated for a given electrical device, but size decreases come at the cost of energy capacity. Conversely, a long lasting energy source can be built but it is often too large or too bulky to be comfortably portable. The result is that the energy source is either too heavy or does not last long enough for a particular user's application.

Numerous different battery systems have been proposed for use over the years. Early rechargeable battery systems included lead acid, and nickel cadmium (NiCad), each of which has enjoyed considerable success in the market place. Lead acid batteries are preferred for applications in which ruggedness and durability are required and hence have been the choice of automotive and heavy industrial settings. Conversely, NiCad batteries have been preferred for smaller portable applications. More recently, nickel metal hydride systems (NiMH) have found increasing acceptance for both large and small applications.

Notwithstanding the success of the foregoing battery systems, other new batteries are establishing a reputation for better capacity, better power density, longer cycle life, and lower weight, as compared with the current state of the art. The first such system to reach the market is the lithium ion battery, which has found its way into numerous consumer products. Lithium polymer batteries have also received considerable attention, although they are only now beginning to reach the market.

Lithium ion batteries in general include a positive electrode fabricated from, for example, a transition metal oxide material, and a negative electrode fabricated from an activated carbon material such as graphite or petroleum coke. New materials for both electrodes have been investigated intensely because of the high potential for improved energy density. Typically the positive and negative electrodes are permeated by a shared electrolyte medium, and are held in close proximity at a uniform distance from each other so as to minimize cell polarization while maximizing the uniformity and efficiency of capacity utilization across the cell. To prevent short circuits and yet allow ion migration across the cell, a thin plastic microporous membrane is commonly placed between the negative and positive electrodes of lithium ion cells.

Typically the electrode active materials are deposited on electrically conducting substrates, also called current collectors, and for reasons of electrochemical stability, the cathode substrate is typically aluminum foil and the anode foil is typically copper foil, though other materials such as carbon substrates could be selected if desired. However, the choice of support media for cell electrodes does not mean that ideal combination of characteristics for service in that capacity have been obtained from aluminum, copper or carbon. Adhesion of electrode coatings to substrates is sometimes quite weak, and copper in particular presents difficulties for workers attempting to bond coatings to it. Adhesion is, of course, dependent upon the degree of oxidation of the surface of the substrate, the cleanliness of the supplied substrate, the choice of the binder used for the active material, as well as roughness and other surface characteristics of active material particles. A poorly adhering coating can lift off of a substrate. This lift-off disrupts the homogeneity of electrical resistance (and thereby current flow) across the surface of such an electrode. Furthermore, if lift-off occurs at the anode of a cell based on lithium ion chemistries, it can lead to lithium plating, dendrite formation and possible hazardous internal short-circuits.

Such lift-off is unusual in conventional lithium ion cells. For those cells, the pressure exerted to maintain the cell in the preferred dimensions is referred to as "stack pressure" due to the serial arrangement of cells either as flat stacks or as a single cell wound as an evenly coiled spool in a circular "stack". In commercial lithium ion cells, stack pressure is typically enforced by placing a tightly rolled ("jelly roll") cell into a rigid metal can (often cylindrical in shape) with internal dimensions that are only slightly larger than the full size of the "jelly roll". Recently, however, the industry has been developing cells housed in lighter and more flexible packaging materials, for instance employing a heat-sealable plastic material such as a thin foil bonded in a sandwich to layers of plastic sheeting. Unlike the rigid cans, this new packaging format cannot be expected to provide sufficient rigidity and strength to maintain the stack pressure of the cell. Thus lift-off of an electrode coating and consequent deterioration of performance can occur in cells with flexible packaging.

Accordingly, there exists a need for electrode compositions with improved adhesion to metal surfaces.

DETAILED DESCRIPTION OF THE PREFERRED EMBODIMENT

Figure 1:
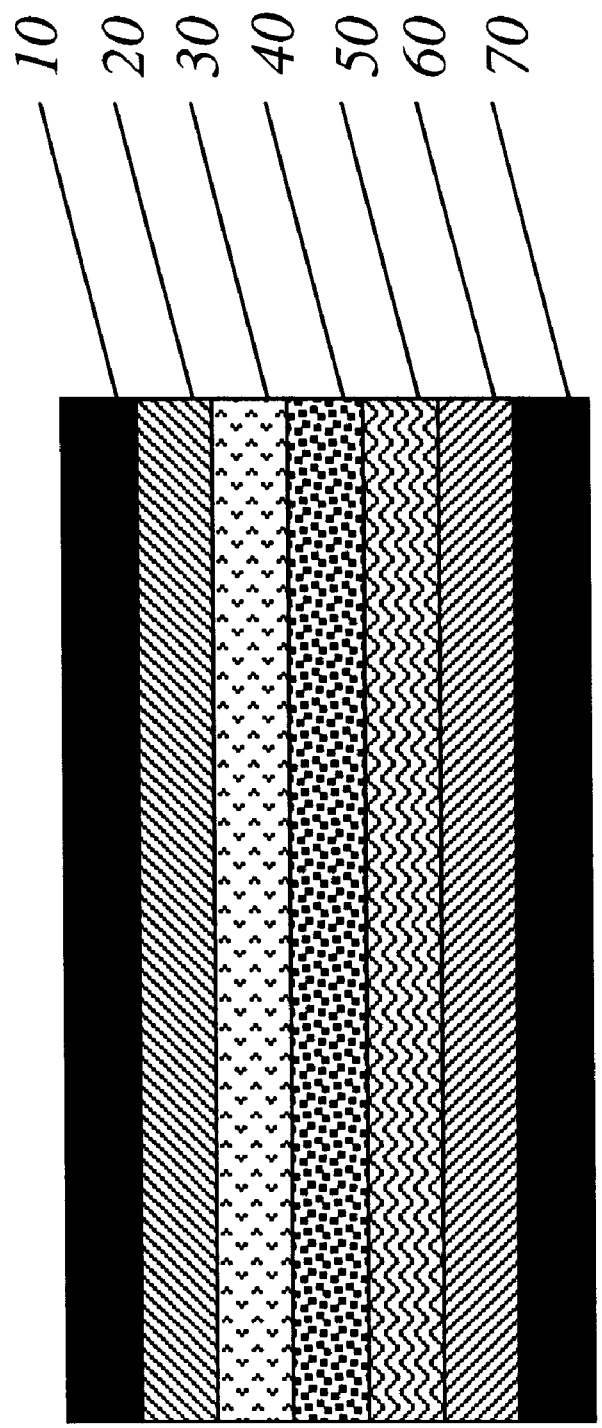
FIG. 1 is a schematic representation of an electrochemical cell (1) made in accordance with the instant invention, comprising a positive current collector (10) upon which is deposited a coating comprising cathode active material (20). The cell as shown further comprises a microporous plastic separator (40) shown optionally coated on either side with an adhesive layer (30 and 50). The cell as shown also comprises an anode coating (60) on a negative current collector (70). One or both of the anode layer (60) and the cathode layer (20) are fabricated in accordance with the instant invention.
Figure 2:
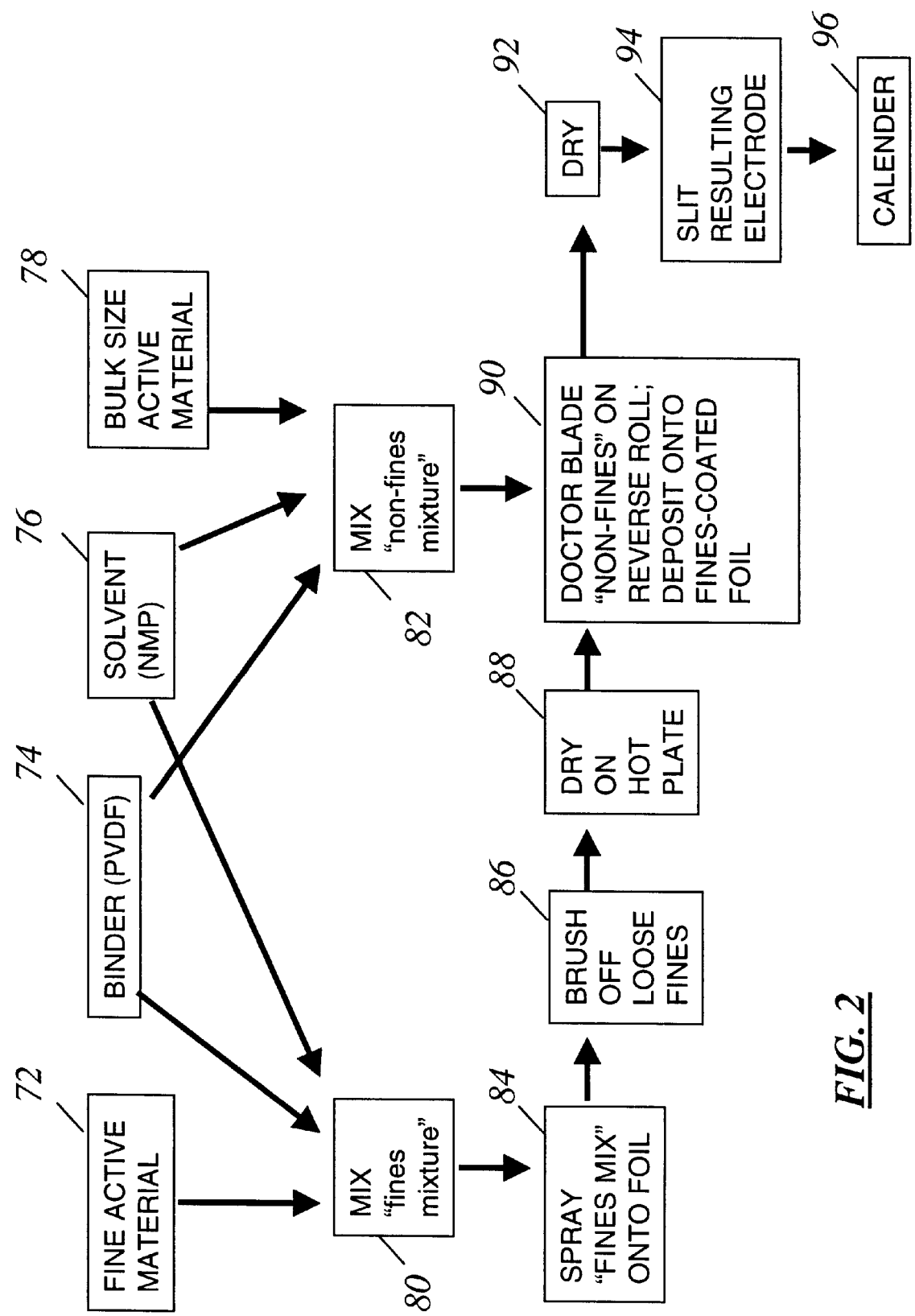
FIG. 2 is a flow chart showing a sequence of steps for fabricating an electrode in accordance with the instant invention, though the invention is not so limited. 2 mass % of very fine (<5 micron particle size) active material (72) is added to a solution comprising polyvinylidene (PVDF) binder (74) dissolved in a N-methylpyrrolidone (NMP) (76), and mixed (80) to produce the "fines mixture" This is sprayed or atomized (84) onto a substrate current collector foil, the loose particles are brushed off by wiping with a laboratory tissue (86), and the thusly modified foil is dried on a hot plate (88). A second slurry is made by adding 10 mass % of an active material having conventional (10 to 100 micron) particle size (78) to a solution comprising PVDF binder (74) dissolved in NMP solvent (76), and mixed (82) to obtain the "non-fines mixture". The "non-fines mixture" is coated by doctor blade (90) onto the fines-coated foil and dried (92). The resulting electrode is slit (94) to the desired width, and calendered (96) to achieve the desired density.

The invention is an electrode coating with improved adhesion to substrates, in which small particles of an active material are preferentially distributed at the interface of the coating and the supporting substrate.

The physical interactions of substances in an electrode are complex, difficult to study in an assembled cell, and often are not fully understood. However, with the understanding that the invention is not so limited, the interface of an electrode coating with a substrate such as a metal foil may be described in the following way. It is well known that every surface has a combination of chemical properties, and that these may include dipolar characteristics, surface roughness, weak bonds (such as hydrogen bonds and van der Waal's forces), ionic charge and or magnetic attractions, Lewis acidity and or basicity, and so forth. Where two surfaces have a complementary combination of characteristics, adhesion and even covalent bonding between them can occur. However the strength of the adhesive joint is proportional to the surface area that is actually responsible for the joint. If one could imagine that a planar-faced iron article could form a good joint with a planar surface of a second, non-ferrous article, it is intuitively apparent that laying the planar face of said non-ferrous article on the tips of a molecular bed-of-nails (in which the nails are iron) would form joints only at the tips, since those are the only sites with which there would be mutual contact. A more extensive (and therefore stronger) bond could be obtained by adhesion between the planar non-ferrous surface and a planar iron surface.

This analogy illustrates one reason why a class of electrode materials with "sliding plane" morphologies can obtain superior adhesion; examples include graphite and molybdenum sulfide. "Sliding plane" materials actually are self-optimizing on complementary surfaces, since the materials can be beneficially compressed or sheared, resulting in a more or less perfect "skin" of molecular planes at the interface. By contrast, otherwise excellent electrode materials that do not shed molecular sheets, and that have irregular shapes, may expose to a planar interface only their own spiny edges and corners, something like a child's toy "jacks". For these spiny or similarly irregular and non-pliable particles, only a small fraction of the adhesive strength on a hard planar substrate can be obtained relative to, say, placing a cubic particle of the same particulate dimensions and surface area and chemical composition on the same substrate.

The bonding of such irregular, non-pliable particles to a substrate surface with complementary properties could be improved, then, simply by increasing the particle surface area at the interface with the substrate. Using a sphere-based approximation, the surface area of a particle doubles with each halving of particle diameter. Also, for a population of particle shapes and sizes that does not pack voidlessly, packing density generally increases inversely with particle size (though mixed particle sizes are even more efficiently packed). This analysis leads to the conclusion that very fine particles will have very high surface area and highly efficient packing, and thus will enhance the adhesion of an electrode coating to a substrate.

In addition to this, extremely fine powder particles (referred to in the industry as "fines") have a viscosifying effect. At the sub-microscopic level, this property offers an opportunity to inhibit binder polymers in an electrode composite from migrating away from the interface at the substrate during deposition by slurry evaporation, and thus the fines can prevent the electrode coating interface from crumbling. It is not uncommon in adhesive failures that the bond at the interface is good, but that one of the members of the joint has a fracture that is parallel to and only nanometers away from the joint itself. While the reasons for this phenomenon may vary depending upon the type of materials forming the joint, we believe that in electrode work the depletion of binder near the joint may be at least partly responsible for the separation of electrode coatings from their substrates.

Generally the fines are deliberately removed from electrode powders. There are a variety of reasons for this. The electrochemical performance of fines is not deemed to be ideal. Not infrequently the fines increase the viscosity of electrode processing slurries to an inconvenient degree, and do it disproportionately relative to their fraction of the composition. And there are other reasons that fines have been considered undesirable to work with, such as their flocculence and tendency to become airborne. However, we find that the fine component of electrode particle size distributions makes a substantial contribution to adhesion at the interface between substrates and irregular, non-pliable electrode particles. The essence of our invention is in distributing fines comprised of electrode active material at the interface between the electrode coating and the substrate.

There are several ways to implement the invention. For instance, one might employ a bimodal size distribution for the electrode powder, in which lower size particles are added back into a mixture after the high and low end sizes have been sieved out by a mechanical classifier unit. Alternatively, one might employ slurries with a "tail" at the low end of the particle size distribution curve, and then allow a slurry comprising the particles to stand for an extended period of time on a substrate such as a current collector: such methods are well-known to favor the settling of smaller particles to the bottom, or at least to form a gradient through the thickness of the film, leaving the largest population of small particles at the lower surface. A variation of the vibration method would be to employ a mixture in which the smaller particles were comprised of a material having a higher intrinsic density than that of the larger particles. A "dry" analogous method would be to coat a substrate with powder containing a fraction of fines, then to vibrate the substrate to cause the fines to settle down toward the substrate surface, and then (e.g., where a fusible polymer binder is present in the powder) to use heat or other treatment to form the actual bond. Alternatively, one might coat the substrate with a thin layer of an electrode slurry comprised primarily of fines, followed by evaporating the liquid medium from the slurry, and then in turn followed by over-coating the resulting electrode with a second coating comprised of "normally" sized (i.e., "bulk") electrode particles.

The small particles may be comprised of the same substance as the active material in the larger particles, or if not, may be comprised of a second active material that is compatible with the first active material, the substrate, and the binder. Suitable particulate active materials for cells with lithium-derived chemistries include substances that can alloy with or intercalate lithium, such as graphites, amorphous carbons, aluminum, silicon, magnesium, lithium metal oxides, lithium metal sulfides, conducting polymers (e.g., polyaniline, polyacetylene, poly(phenylene vinylene), polythiophene, polypyrrole, and the like), and combinations thereof. Because a relatively small proportion of the small-size particles are needed to effect bonding, one could equally well employ particles comprised of a substance other than an electrode active material. However, with the increasing importance of energy density in electrochemical cells, the most advantageous small-size particles will be those that can double as high-capacity electrode particles.

Note that this method is not to be confused with pre-coating a substrate with a generic conducting "ink". A conducting ink typically does have good adhesion to a current collector (i.e., substrate) surface, and serves as a primer coat to enable bonding by the subsequent over-coat of electrode. However, while conducting inks may contain some proportion of carbon to enhance the electrical conductivity of the printed ink, their purpose is not to serve a dual function as an electrode active material. In general the electrochemical capacity of carbons used in inks is quite modest or negligible, thus they have negligible or negative effects on the energy density of the electrode.

The term "small", as used here in describing particle size, refers to a particle diameter of about five micrometers and below. For a lithium ion cell, particles of active material are more usually 10 to 50 micrometers in diameter. Manufacturers of lithium ion active materials typically have controls to remove almost all of the material that falls outside of those particle-size boundaries, and to provide a reproducible particle size distribution from lot to lot.

The choice of particle size and active material is not the only consideration. It is equally important that the electrode binder polymers permit the cell to operate in a useful way. However, the invention is not otherwise limited by the choice of binder polymers. A few examples of binder polymers include poly(vinylidene fluoride), poly (tetrafluoroethylene), poly(ethylene), poly(propylene), epoxies, carbonized binders, and conducting polymers such as polyacetylene, poly(phenylene vinylene), polypyrrole, polythiophene, polyaniline, and their blends, copolymers, and derivatives.

It is believed that the invention may be better understood by a consideration of the following example.

EXAMPLE

A suspension of a "fines" mixture for a sprayable electrode deposition solution was made by dissolving 0.0505 g polyvinylidene (PVDF) binder in N-methylpyrrolidone (NMP) solvent, then adding 0.663 g MCMB 6-28 grade graphite (this had 6 micron particle diameter) and 0.285 g of a fine proprietary amorphous carbon that had been synthesized as described in U.S. patent application Ser. No. 08/660,320, filed Jun. 7, 1996 in the names of Zhang and Denton, and commonly assigned to Motorola, Inc., entitled CARBON ELECTRODE MATERIAL FOR ELECTROCHEMICAL CELLS AND METHOD OF MAKING SAME. In addition, an amount of oxalic acid equivalent to 0.1% of the solids (including PVDF) content was dissolved in the NMP. The fine amorphous carbon had particle diameters of 5 microns of less, and had been separated from a distribution of particle sizes using a mechanical classifier (a model Alpine ATP 100, made by the Hosokawa company), confirmed by analysis of isopropanolic suspensions in a particle size analyzer (a "Mastersizer" model made by Malvern Instruments Ltd., Spring Lane south, Malvern, Worcestershire WR14AT, U.K., telephone [44](0) 1684-892456, facsimile [44](0) 1684-892789. The NMP solution was further diluted by another 0.9595 g to decrease the viscosity. Final solids content of the suspension (including PVDF as a solid in the calculation) of the NMP solution was about 10 mass %.

The MCMB 6-28 graphite product was made by Osaka Gas Chemicals Co., Ltd., 3-6-14, Bingomachi, Chuo-ku, Osaka 541, Japan, and purchased through Mitsui and Co. (U.S.A.), Inc. (a trading company), Corporate Headquarters, 200 Park Avenue, New York, N.Y. 10166-0130, telephone (212) 878-4451, facsimile (212) 878-4489. The grade of PVDF used was Kynar 461™, product code 02581-0, purchased from ElfAtochem North America, Plastics Department, Three Parkway, Philadelphia, Pa. 19102, (215) 587-7528. The N-methyl pyrrolidone was anhydrous, and was purchased from The N-methyl pyrrolidone was anhydrous, and was purchased from Harcros, 4030 Fambrough Drive, Powder Springs, Ga. 30127, telephone 770 943-8966, or alternatively from ISP Technologies, Inc., 1361 Alps Road, Wayne, N.J. 07470, USA, telephone (800) 438-1859), catalog number 11727551015. The oxalic acid was purchased from Aldrich Chemical Company, catalog number 24,117-2, Aldrich is located at 1001 West Saint Paul Avenue, Milwaukee, Wis. 53233 USA, telephone (414) 273-3850, facsimile (414) 273-4979. The copper foil was obtained as electrochemically deposited copper foil, 10 microns thick, 200 mm wide, in 200 m rolls; the maker was Fukuda; the trading house from which the foil was supplied is Sumitomo Corporation of America, Six Concourse Parkway, Suite 2150, Atlanta, Ga. 30328, telephone (770) 399-3160, facsimile (770) 399-4690.

This suspension was sprayed manually onto a copper current collector with a hobbyist air brush (Artist Air Brush: made by the Badger company) to obtain a permanent coating; the coating was sparse yet uniformly dispersed: the loading was less than 10 mg per square centimeter, but appeared to be bonded to the metal substrate. The sprayed coating was lightly brushed with a laboratory tissue to remove loose particles, and was dried on a hot plate held at 100 to 150 degrees C. for 40 minutes.

A "bulk" mixture of electrode slurry was made for the purpose of producing a final (solvent-free) coating composition of: 4.9 mass % PVDF; 0.1% oxalic acid; 47.5 mass % SFG-44 graphite; and 47.5 mass % of proprietary amorphous carbon. This involved first dissolving making an NMP solution containing 4.9 mass % PVDF and 0.1 mass % relative to the NMP, then adding the graphite and amorphous carbon, and mixing. This yielded slurries with about 51.28 mass % solids content. To lower viscosity and enhance coatability, this slurry was diluted with additional NMP to obtain a solids content of about 40 mass % or even as low as 35%. The slurry was ball-milled for six minutes using an alumina bead. The SFG-44 grade graphite was purchased from Lonza, Inorganic Chemical Division, Fairlawn, N.J. 07410, (201) 791-7500. The PVDF was Kynar 461™, product code 02581-0, purchased from Elf Atochem North America, Plastics Department, Three Parkway, Philadelphia, Pa. 19102, (215) 587-7528.

The "bulk" slurry was continuously metered onto the fines-coated copper foil using a manual doctor blade, and the NMP was removed by evaporation on a hot plate at 100 to 150 degrees C. for 40 minutes. The final foil was slit to 42 cm×14 cm, then it was calendered at ca. 10 cm/min, using a force of 50 kgf (ca. 150 kgm) and a 30 micron gap. The calendering machine was a "steel and steel" calendar manufactured by Yasui Seiki, of Kanagawa, Japan, of manufacturing no. 195038 and type number 1-057. The final thickness of the double-coated electrode, including foil, fines coatings, and bulk coatings coating was 0.144 cm, and the final density of the coating was 1.3 g/cm$^3$.

Figure 3:
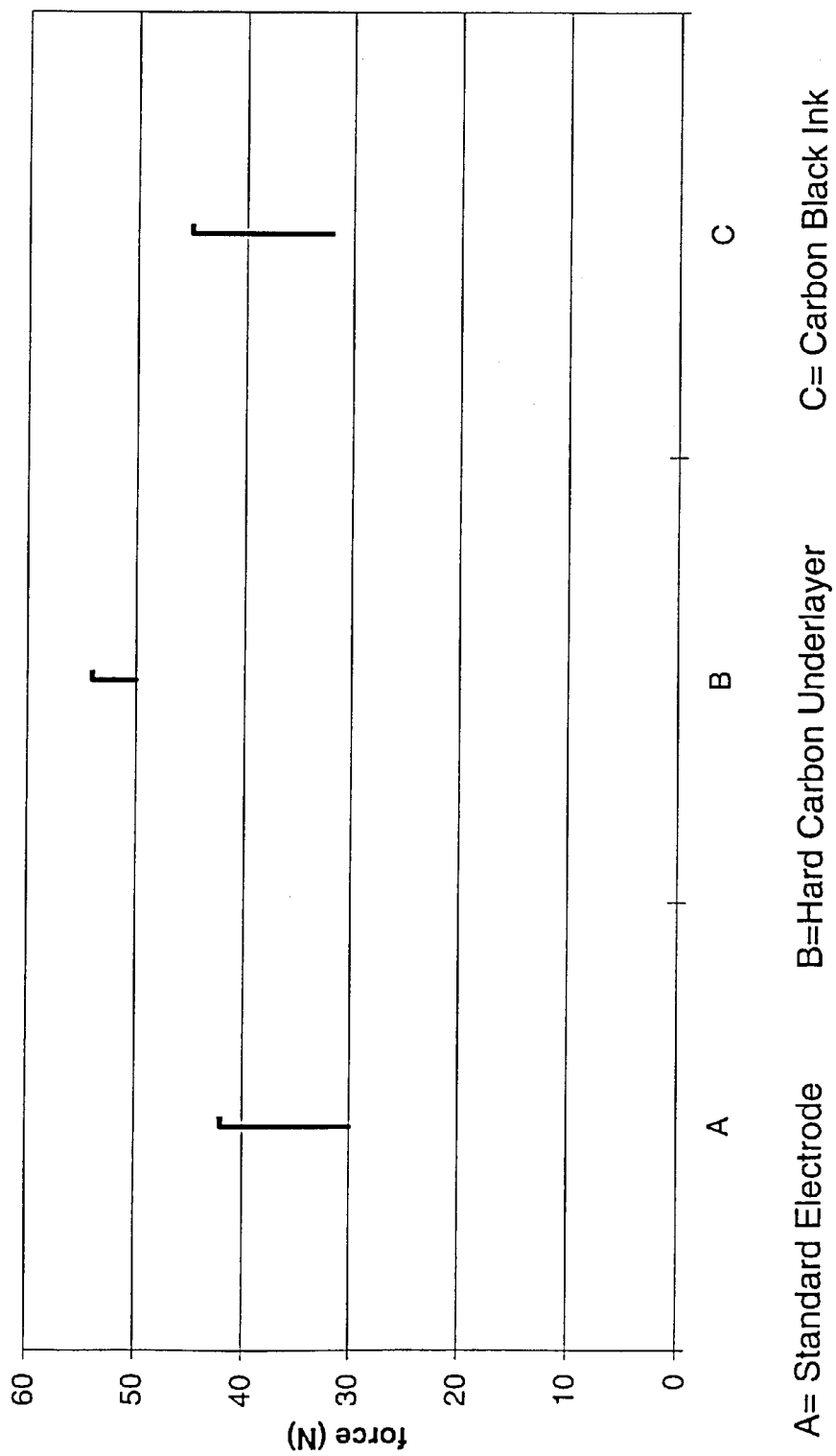
FIG. 3 is a graph comparing adhesive strength for an electrode made according to the instant invention compared to a control electrode without it. The data range represented by A is for a control electrode coated on one side only, and without the fines layer of the invention. The data range represented by B is for an electrode coated on one side only, and possessing a primer comprised of very fine, high-capacity electrode carbon primer layer made according to the invention. The data range represented by C is for a different control electrode coated on one side only, and where the primer layer is made as described for the invention except that it has a carbon black (with little or negligible capacity for energy storage in a lithium ion cell) substituted for the electrode fines. It can be seen from the data that the invention provides both superior adhesion, as represented by the magnitude of the data, and also a greater reliability, as represented by the narrowness of its data range relative to those of the two controls.

The peel strength was determined on electrodes that had only been coated on one side, and found about 52 Newtons with a narrow spread of data points between different samples, as compared to an average of 36 Newtons and a substantially wider spread of data points for a control sample without the layer of fines. An additional comparison is obtained against an electrode made as in Example 1 using carbon black instead of electrode active material. The peel strength with the carbon black primer layer used was about 39 Newtons, with a spread width of data points approximately the same as that for the control sample with no under layer of fines. These results are represented in FIG. 3. The carbon black fines layer was made in the same way as the first described fines layer except that the solids in the suspension of fines consisted only of 0.0112 g PVDF and 0.2 g carbon black and, relative to the solids (including PVDF) 0.1 mass % of oxalic acid in 15.36 g NMP, resulting in a 2% solution of solids. The lower solids content was necessitated by the higher viscosity of the carbon black. The like-adheres-to-like principle is speculated to account at least in part for the superior adhesion of the electrode carbon fines relative to the carbon black fines. The carbon black is sold under the tradename "Super P Battery Black" by M.M.M. Carbon, Av. Louise 534-Bte 1, B 1050 Brussels-Belgium, telephone (32-2) 627 54 29; facsimile (32-2) 627 53 93; telex 21489 mmm B.

Measurement of electrode coating adhesion to the substrate was performed using a MiniMat 2000 materials tester (from Rheometric Scientific, One Possumtown Road, Piscataway, N.J. 08854). Prior to testing, one side of a double-coated electrode was cleaned with acetone or isopropanol to remove the electrode coating on that side, then dried. The resulting single-coated electrode was cut into disks with a 25 mm circumference to fit the mechanical stage of the tester. Each of the two surfaces of the test unit that were exposed to the sample for tensile tests had a double-sided adhesive tape ("Tesafix") bonded to it. A disk was placed onto the mechanical stage and subjected to a compressive load of 2 Newtons by the tape-covered machine parts, and then subjected to a constant deformation in the tensile direction: this allowed measurement of the force required to peel the electrode from the current collector substrate. The force was sensed by measuring the displacement of a calibrated precision lad beam with a linear voltage displacement transducer.

It will be appreciated by now that there has been provided a method for fabricating electrode coatings with improved adhesion and cyclability. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrode coating with improved adhesion to a substrate for use in cells based on lithium ion chemistries, wherein said electrode coating comprises:

smaller particles of a first active material;

larger particles of a second active material; and a binder;

wherein said smaller particles are distributed at the interface of said electrode coating and said substrate.

2. The electrode coating of claim 1, wherein said first active material comprises a substance selected from the group consisting of graphite, coke, amorphous carbon, lithium metal, lithium alloys, lithium metal oxides, lithium metal sulfides, conducting polymers, and combinations thereof.

3. The electrode coating of claim 1, wherein said second active material comprises a substance selected from the group consisting of graphite, coke, amorphous carbon, lithium metal, lithium alloys, lithium metal oxides, lithium metal sulfides, conducting polymers, and combinations thereof.

4. The electrode coating of claim 1, wherein said binder comprises a substance selected from the group consisting of poly(vinylidene fluoride), poly(tetrafluoroethylene), poly (ethylene), poly(propylene), epoxies, carbonized binders, polyacetylene, poly(phenylene vinylene), polypyrrole, polythiophene, polyaniline, and combinations thereof.

5. The electrode coating of claim 1, wherein said smaller particles are less than about 5 micrometers in average particle diameter.

6. The electrode coating of claim 1, wherein said smaller particles are less than about 0.1 micrometers in average particle diameter.

7. The electrode coating of claim 1, wherein said electrode coating is comprised of between 1 mass percent and 10 mass percent of said smaller particles.

8. The electrode coating of claim 1, wherein said electrode coating is comprised of between 0.1 mass percent and 1.0 mass percent of said smaller particles.

9. The electrode coating of claim 1, wherein said first and said second active materials each comprise an amorphous carbon, said binder is comprised of poly(vinylidene fluoride) material, and said substrate is comprised of copper.

10. The electrode coating of claim 9, wherein the electrode coating comprises less than about five mass percent of said smaller particles, and said smaller particles comprise an average particle size less than about 5 micrometers.

* * * * *